US012654284B2

(12) United States Patent
Chiang et al.

(10) Patent No.: US 12,654,284 B2
(45) Date of Patent: Jun. 16, 2026

(54) SLURRY DISPERSION SYSTEM WITH REAL TIME CONTROL

(71) Applicant: TAIWAN SEMICONDUCTOR MANUFACTURING CO., LTD., Hsinchu (TW)

(72) Inventors: I-Chen Chiang, Hsinchu City (TW); Hwai-Te Chiu, Hsinchu City (TW); Yi-Tsang Chen, Taipei City (TW); Chih-Chiang Tseng, Hsinchu County (TW); Yung-Long Chen, New Taipei City (TW)

(73) Assignee: TAIWAN SEMICONDUCTOR MANUFACTURING CO., LTD., Hsinchu (TW)

( * ) Notice: Subject to any disclaimer, the term of this patent is extended or adjusted under 35 U.S.C. 154(b) by 113 days.

(21) Appl. No.: 18/474,165

(22) Filed: Sep. 25, 2023

(65) Prior Publication Data

US 2024/0009803 A1     Jan. 11, 2024

Related U.S. Application Data

(60) Division of application No. 16/894,649, filed on Jun. 5, 2020, now Pat. No. 12,042,904, which is a continuation of application No. 14/502,917, filed on Sep. 30, 2014, now Pat. No. 10,688,623.

(51) Int. Cl.
B24B 57/04          (2006.01)
B24B 37/005        (2012.01)
B24B 37/04          (2012.01)

(52) U.S. Cl.
CPC ............ B24B 57/04 (2013.01); B24B 37/005 (2013.01); B24B 37/042 (2013.01); Y02P 70/10 (2015.11)

(58) Field of Classification Search
CPC ......... B24B 57/02; B24B 57/04; B24B 7/228; B24B 37/005; B24B 37/0056; B24B 37/044
USPC ......... 451/60, 446, 447, 36, 41, 5, 8, 87, 88
See application file for complete search history.

(56) References Cited

U.S. PATENT DOCUMENTS

| | | | |
|---|---|---|---|
| 5,664,990 A | 9/1997 | Adams et al. | |
| 6,048,256 A | 4/2000 | Obeng et al. | |
| 6,106,728 A | 8/2000 | Iida et al. | |
| 6,338,671 B1 | 1/2002 | Kawashima et al. | |
| 6,527,969 B1 | 3/2003 | Tanoue et al. | |
| 6,709,313 B2 * | 3/2004 | Kondo ................... | B24B 57/02 451/6 |

(Continued)

FOREIGN PATENT DOCUMENTS

EP          1043122 A2    10/2000

*Primary Examiner* — Makena S Markman
(74) *Attorney, Agent, or Firm* — Maschoff Brennan

(57) ABSTRACT

A slurry dispersion system is provided, and includes a slurry source system, an in-line analyzer and a controller. The slurry source system provides a slurry for a chemical mechanical polishing (CMP) process. The in-line analyzer measures at least large particle count (LPC) value of a sampled slurry sampled from the slurry dispersion system, and generates an indication signal based on the LPC value, in which the indication signal indicates at lease one characteristic of the slurry. The controller receives the indication signal, and generates a control signal based on the indication signal for performing a real time control on the slurry dispersion system for controlling quality of the slurry.

20 Claims, 6 Drawing Sheets

(56)  References Cited

U.S. PATENT DOCUMENTS

| | | | | |
|---|---|---|---|---|
| 6,923,568 B2 * | 8/2005 | Wilmer | ............... | B01F 25/3131 |
| | | | | 366/152.2 |
| 9,159,573 B2 | 10/2015 | Chiang et al. | | |
| 10,688,623 B2 * | 6/2020 | Chiang | ................ | B24B 37/042 |
| 12,042,904 B2 * | 7/2024 | Chiang | ................ | B24B 37/005 |
| 2003/0100247 A1 * | 5/2003 | Kim | ........................ | B01F 23/59 |
| | | | | 451/60 |
| 2007/0295063 A1 | 12/2007 | Cho et al. | | |
| 2008/0076332 A1 | 3/2008 | Serafin et al. | | |
| 2009/0053981 A1 | 2/2009 | Kozasa et al. | | |
| 2014/0261824 A1 | 9/2014 | Byers et al. | | |
| 2014/0273753 A1 * | 9/2014 | Matsuo | ................ | B24B 37/005 |
| | | | | 451/6 |
| 2015/0267081 A1 | 9/2015 | Fu et al. | | |
| 2015/0376461 A1 | 12/2015 | Grumbine et al. | | |
| 2016/0376468 A1 | 12/2016 | Inui et al. | | |
| 2020/0101582 A1 | 4/2020 | Liu et al. | | |

* cited by examiner

<u>600</u>

SLURRY DISPERSION SYSTEM WITH REAL TIME CONTROL

RELATED APPLICATIONS

The present application is a divisional application of U.S. application Ser. No. 16/894,649, filed on Jun. 5, 2020, which is a continuation application of U.S. application Ser. No. 14/502,917, filed on Sep. 30, 2014, now U.S. Pat. No. 10,688,623, issued Jun. 23, 2020 which is herein incorporated by reference in its entirety.

BACKGROUND

In semiconductor fabrication, a chemical mechanical polishing (CMP) technique is usually used for removing excess materials formed on a semiconductor substrate and for global planarization of layers formed on the semiconductor substrate. In a CMP process, a slurry is used for both chemical and mechanical polishing, which includes chemicals and abrasive particles. Typically, the slurry is provided by a slurry dispersion system (SDS) and applied directly onto a wafer surface to be polished. The quality of the slurry affects the performance of the CMP process, such as process defects and a removal rate. If the quality of the slurry is found abnormal, the slurry dispersion system may be adjusted or stopped in order to avoid causing damages to the wafer surface in the CMP process.

Conventionally, the quality of the slurry stored in the slurry dispersion system is analyzed by an off-line monitor, but not in real time. In other words, the abnormality of the slurry cannot be detected in time, and may cause damages to the wafer surface during the CMP process before being detected by the off-line monitor, thus resulting in performance degradation of the CMP process.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
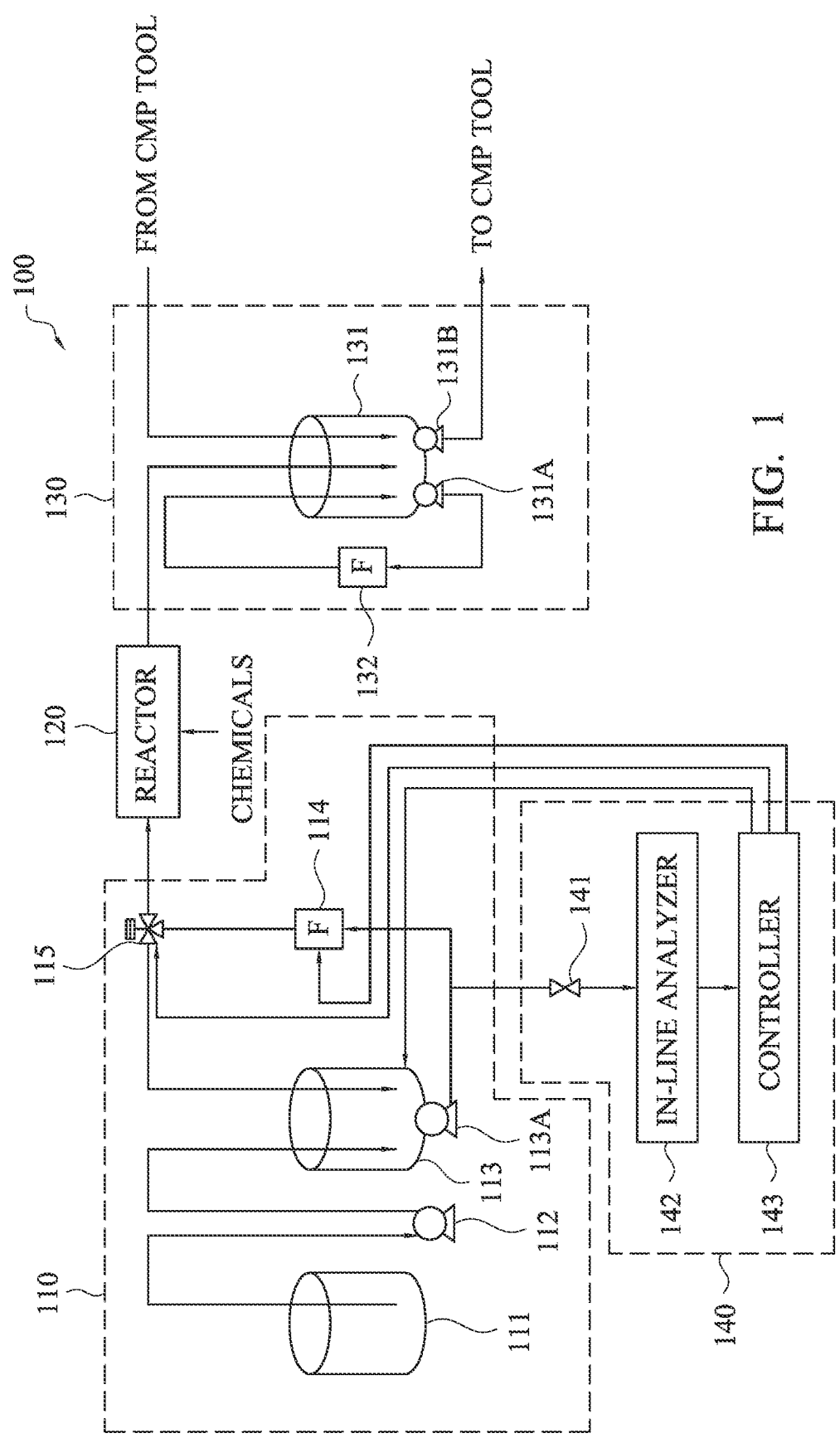
FIG. 1 is a schematic diagram of a slurry dispersion system in accordance with various embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the present disclosure may repeat reference numerals and/or letters in the various examples. This repetition is for the purpose of simplicity and clarity and does not in itself dictate a relationship between the various embodiments and/or configurations discussed. As used herein, the term "and/or" includes any and all combinations of one or more of the associated listed items.

Terms used herein are only used to describe the specific embodiments, which are not used to limit the claims appended herewith. For example, unless limited otherwise, the term "a", "an" or "the" of the single form may also represent the plural form.

The terms such as "first," "second" and "third" are used for describing various layers, though such terms are only used for distinguishing one layer from another layer. Therefore, the first layer may also be referred to as the second layer without departing from the spirit of the claimed subject matter, and the others are deduced by analogy.

Embodiments of the present disclosure are directed to providing a slurry dispersion system and a method for real time feed-back controlling the slurry dispersion system used for a chemical mechanical polishing (CMP) process. In this method, a slurry in the slurry dispersion system is first sampled to obtain a sampled slurry, and then, a parameter of the sampled slurry is measured, and factors of the slurry dispersion system are controlled based on the parameter. In the embodiments of the present disclosure, the parameter of the sampled slurry is measured in real-time, and the quantity of large particles in the slurry is automatically controlled, and the quality of the slurry is compensated or adjusted instantly. Therefore, automatic and dynamic control of the slurry dispersion system is realized, so as to enhance supplying quality and stability of the slurry dispersion system, and thus process defects and a removal rate of the CMP process can be improved.

FIG. 1 is schematic diagram of a slurry dispersion system 100 in accordance with some embodiments. The slurry dispersion system 100 is utilized for providing a slurry to a polishing process such as CMP process or the like. In the present disclosure, the slurry dispersion system 100 is applied to a CMP tool which performs a CMP process, in which the slurry includes abrasive particles for abrasively removing a portion of a workpiece surface (such as a wafer surface). The abrasive particles of the slurry may include, but not limited to, ceria, silica and/or alumina. As shown in FIG. 1, the slurry dispersion system 100 includes a slurry source system 110, a reactor 120, a slurry supply system 130 and a control system 140. The slurry source system 110 includes a slurry drum 111, a slurry pump 112, a source tank 113, a filter 114 and a three-way valve 115. The slurry drum 111 contains an undiluted slurry. The slurry pump 112 transports the undiluted slurry to the source tank 113. The slurry pump 112 may control the transport rate of the slurry undiluted to the source tank 113. In the source tank 113, the undiluted slurry is collected from the slurry drum 111 and re-circuited through the filter 114 and the three-way valve 115 via a pump 113A. The filter 114 receives the undiluted slurry from the source tank 113, and selectively filters the undiluted slurry. The abrasive particles of the undiluted slurry have various sizes, in which an abrasive particle is defined as a large particle if its size is greater than a predetermined size. It is noted that the predetermined size for determining the large particle may vary in accordance with various applications. The filter 114 filters out at least a portion of the large particles in the undiluted slurry, such that a large particle count (LPC) value of the undiluted slurry is decreased. The three-way valve 115 controls the undiluted slurry to stay in the same stage or to enter the next stage. That is, the three-way valve 115 controls the undiluted slurry to flow back to the source tank 113 or into the reactor 120. The source tank 113, the filter 114 and the three-way valve 115 form a re-circulation loop, so as to dynamically adjust the LPC value of the undiluted slurry in the source tank 113.

In the reactor 120, the undiluted slurry from the slurry source system 110 is mixed with at least one chemical to obtain a mixed slurry. The chemical may include, but not limited to, hydrogen peroxide, potassium and/or ammonium hydroxide. In some embodiments, the reactor 120 is a static mixer used to mix the slurry with the chemical to form the mixed slurry. In some embodiments, the reactor 120 is a mixing tank.

The slurry supply system 130 includes a supply tank 131 and a filter 132. In the supply tank 131, the mixed slurry is collected from the reactor 120, and is re-circulated through the filter 132 via a pump 131A. The filter 132 receives the mixer slurry from the supply tank 131, and selectively filters the mixed slurry. The filter 132 filters out at least a portion of the large particles of the mixed slurry, such that the number of large particles of the mixed slurry is decreased. The supply tank 131 and the filter 132 form a re-circulation loop, so as to dynamically adjust the number of large particles of the mixed slurry in the supply tank 131. A pump 131B is used for transporting the mixed slurry to the CMP tool. The mixed slurry may return to the supply tank 131 from the CMP tool.

The control system 140 includes a sampling valve 141, an in-line analyzer 142 and a controller 143. The sampling valve 141 samples the undiluted slurry outputted from the source tank 113 to obtain a sampled slurry. The in-line analyzer 142 measures at least one parameter of the sampled slurry. The parameter may include a large particle count (LPC) value, which is a value relative to the number of large particles of the slurry, and/or include a zeta potential value, which is a value relative to the average electrical potential at a hydrodynamic slipping plane adjacent to a solid surface of each large particle exposed to a dispersing medium of the slurry. The in-line analyzer 142 generates an indication signal based on the parameter, in which the indication signal indicates at least one characteristic of the slurry. The controller 143 receives the indication signal, and generates a control signal based on the indication signal to perform a real time feedback control on the slurry dispersion system 100.

Figure 2:
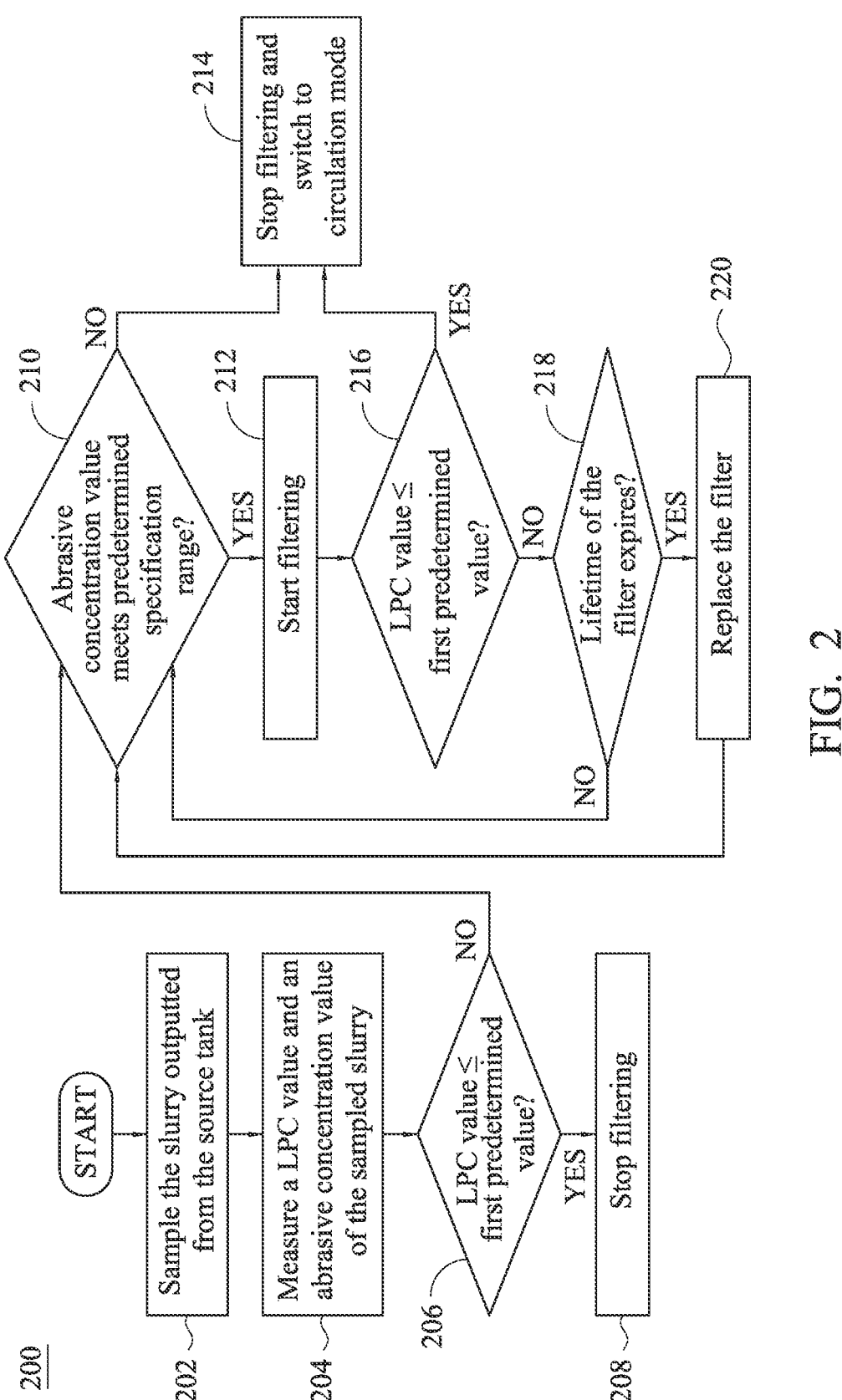
FIG. 2 is flow chart of a method for controlling slurry quality of a slurry dispersion system in accordance with some embodiments.

FIG. 2 is flowchart diagram of a method 200 for controlling slurry quality of a slurry dispersion system in accordance with various embodiments. The method 200 may be operated in the slurry dispersion system 100 or other systems similar to the slurry dispersion system 100. The following describes the method 200 operated in the control system 140 of the of the slurry dispersion system 100 for illustration. The method 200 begins at operation 202, where the sampling valve 141 samples the slurry outputted from the source tank 113, and allows the sampled slurry to be forwarded to the in-line analyzer 142. At operation 204, the in-line analyzer 142 measures a LPC value and an abrasive concentration value of the sampled slurry.

At operation 206, the in-line analyzer 142 compares the LPC value of the sampled slurry with a first predetermined threshold. If the comparing result indicates that the LPC value of the sampled slurry is lower than or equal to the first predetermined threshold, operation 208 is then performed, where the in-line analyzer 142 generates an indication signal indicating that a LPC value of the slurry reaches a LPC target, and the controller 143 generates a control signal for controlling the filter 114 to stop filtering on the slurry in response to the indication signal. On the contrary, if the comparing result indicates that the LPC value of the sampled slurry is higher than the first predetermined threshold, operation 210 is then performed, where the in-line analyzer 142 determines whether the abrasive concentration value of the sampled slurry is in a predetermined specification range.

At operation 210, if the determination result indicates that the abrasive concentration value of the sampled slurry is in the predetermined specification range, operation 212 is then performed, where the in-line analyzer 142 generates an indication signal indicating that an abrasive concentration value of the slurry meets a predetermined specification range, and the controller 143 generates a control signal for controlling the filter 114 to perform filtering on the slurry in response to the indication signal. In some embodiments, the control signal adjusts a filtering rate of the filter 114 based on a difference between the abrasive concentration value of the sampled slurry and the predetermined specification range. On the contrary, if the determination result indicates that the abrasive concentration value of the sampled slurry is out of the predetermined specification range, operation 214 is then performed, where the in-line analyzer 142 generates an indication signal indicating that the abrasive concentration value of the slurry does not meet the predetermined specification range, and the controller 143 generates a control signal for controlling the filter 114 to stop filtering on the slurry and switching the slurry source system 110 to a circulation mode to avoid over-filtration in response to the indication signal.

At operation 216, the in-line analyzer 142 compares the LPC value of the sampled slurry with the first predetermined threshold. If the comparing result indicates that the LPC value of the sampled slurry is lower than or equal to the first predetermined threshold, operation 214 is then performed, where the in-line analyzer 142 generates an indication signal indicating that the LPC value reaches a LPC target, and the controller 143 generates a control signal for controlling the filter 114 to stop filtering on the slurry and switching the slurry source system 110 to a circulation mode to avoid over-filtration in response to the indication signal. On the contrary, if the comparing result indicates that the LPC value of the sampled slurry is higher than the first predetermined threshold, operation 218 is then performed, where the in-line analyzer 142 determines whether a lifetime of the filter 114 expires.

At operation 218, if the determination result indicates that the lifetime of the filter 114 expires, operation 220 is then performed, where the in-line analyzer 142 generates an indication signal indicating the expiration of the filter 114, and the controller 143 issues a notification accordingly, so as to inform that the filter 114 to be substituted with a new filter. After the operation 220, operation 210 is then performed. On the contrary, if the determination result indicates that the lifetime of the filter 114 does not expire, operation 210 is then performed.

In some embodiments, analysis and determination of the abrasive concentration value of the sampled slurry, as illustrated in operations 204 and 210, may be alternatively substituted by analyzing a zeta potential value of the sampled slurry and comparing the zeta potential of the sampled slurry with a second predetermined threshold, since the relationship between the abrasive concentration value and the zeta potential value is substantially linear.

By performing the method 200, the operation of the circulation loop of the slurry source system 110 is controlled, and the filtering rate of the filter 114 is dynamically adjusted, such that the quantity of large particles in the slurry is automatically controlled. Therefore, automatic and dynamic control of the slurry dispersion system 100 is realized.

Figure 3:
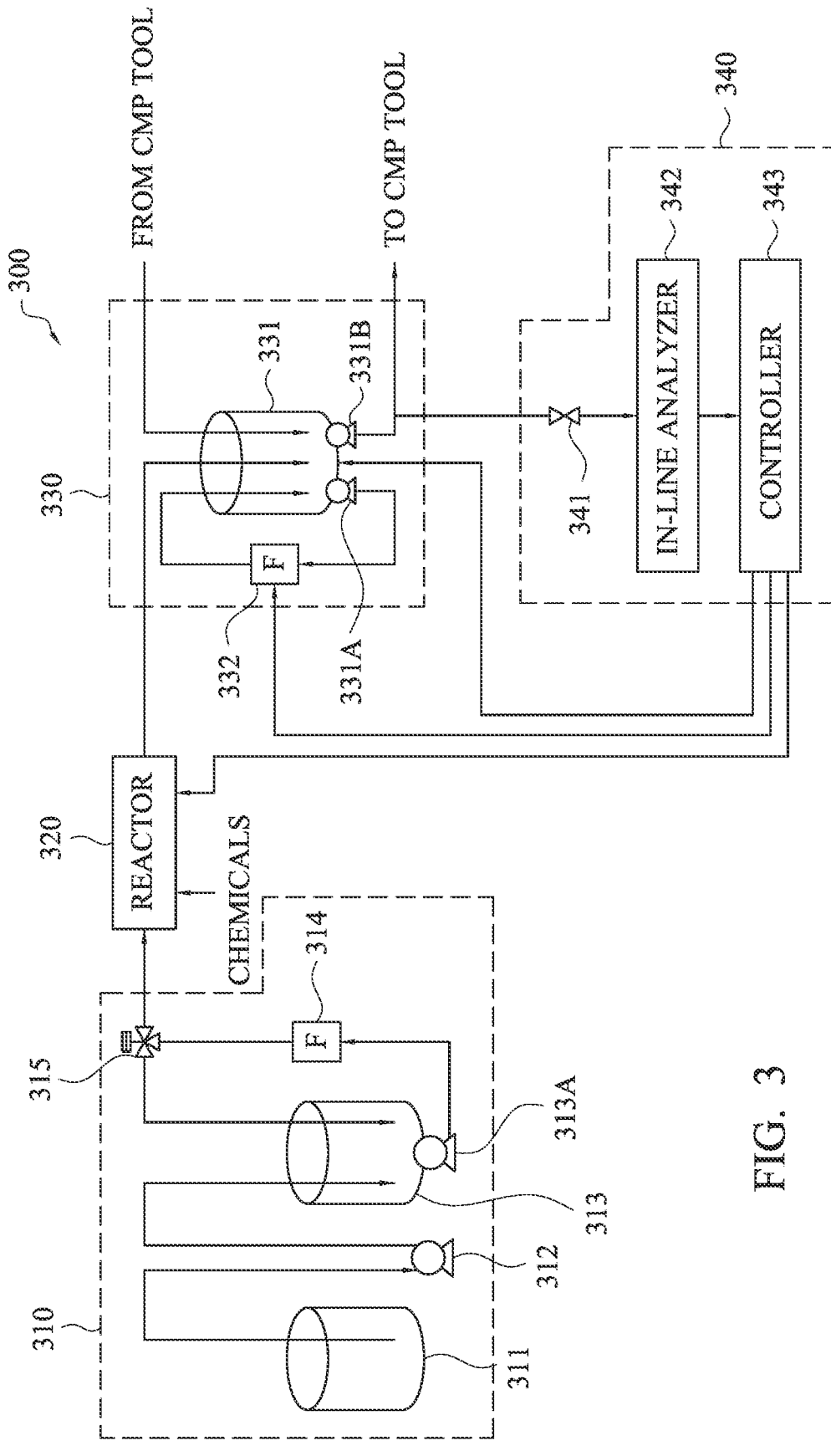
FIG. 3 is a schematic diagram of a slurry dispersion system in accordance with various embodiments.

FIG. 3 is schematic diagram of a slurry dispersion system 300 in accordance with some embodiments. The slurry dispersion system 300 is utilized for providing a slurry to a polishing process such as CMP process or the like. In the present disclosure, the slurry dispersion system 300 is applied to a CMP tool which performs a CMP process, in which the slurry includes abrasive particles for abrasively removing a portion of a workpiece surface (such as a wafer surface). The slurry dispersion system 300 includes a slurry source system 310, a reactor 320, a slurry supply system 330 and a control system 340. The slurry source system 310 includes a slurry drum 311, a slurry pump 312, a source tank 313, a filter 314 and a three-way valve 315. The slurry supply system 330 includes a supply tank 331 and a filter 332. The supply tank 331 collects a mixed slurry from the reactor 320, the filter 332 and the CMP process, and transports the mixed slurry to the filter 332 via a pump 331A. The supply tank 331 also includes a pump 331B for transporting the mixed slurry to the CMP process. Since the slurry source system 310, the reactor 320 and the slurry supply system 330 are essentially the same as the slurry source system 110, the reactor 120 and the slurry supply system 130 respectively, the details thereof are not described again herein.

The control system 340 includes a sampling valve 341, an in-line analyzer 342 and a controller 343. The sampling valve 341 samples the mixed slurry outputted from the supply tank 331 to obtain a sampled slurry. The in-line analyzer 342 measures at least one parameter of the sampled slurry. The parameter may include a LPC value, which is a value relative to the number of large particles of the mixed slurry, or include a zeta potential value, which is a value relative to the average electrical potential at a hydrodynamic slipping plane adjacent to a solid surface of each large particle exposed to a dispersing medium of the mixed slurry. In some embodiments, the parameter may further include a hydrogen ion concentration (pH) value, a specific gravity value and/or a chemical concentration value (e.g. hydrogen peroxide concentration value), but is not limited thereto. The in-line analyzer 342 generates an indication signal based on the parameter, in which the indication signal indicates at lease one characteristic of the mixed slurry. The controller 343 receives the indication signal, and generates a control signal based on the indication signal to perform a real time feedback control on the slurry dispersion system 300.

Figure 4:
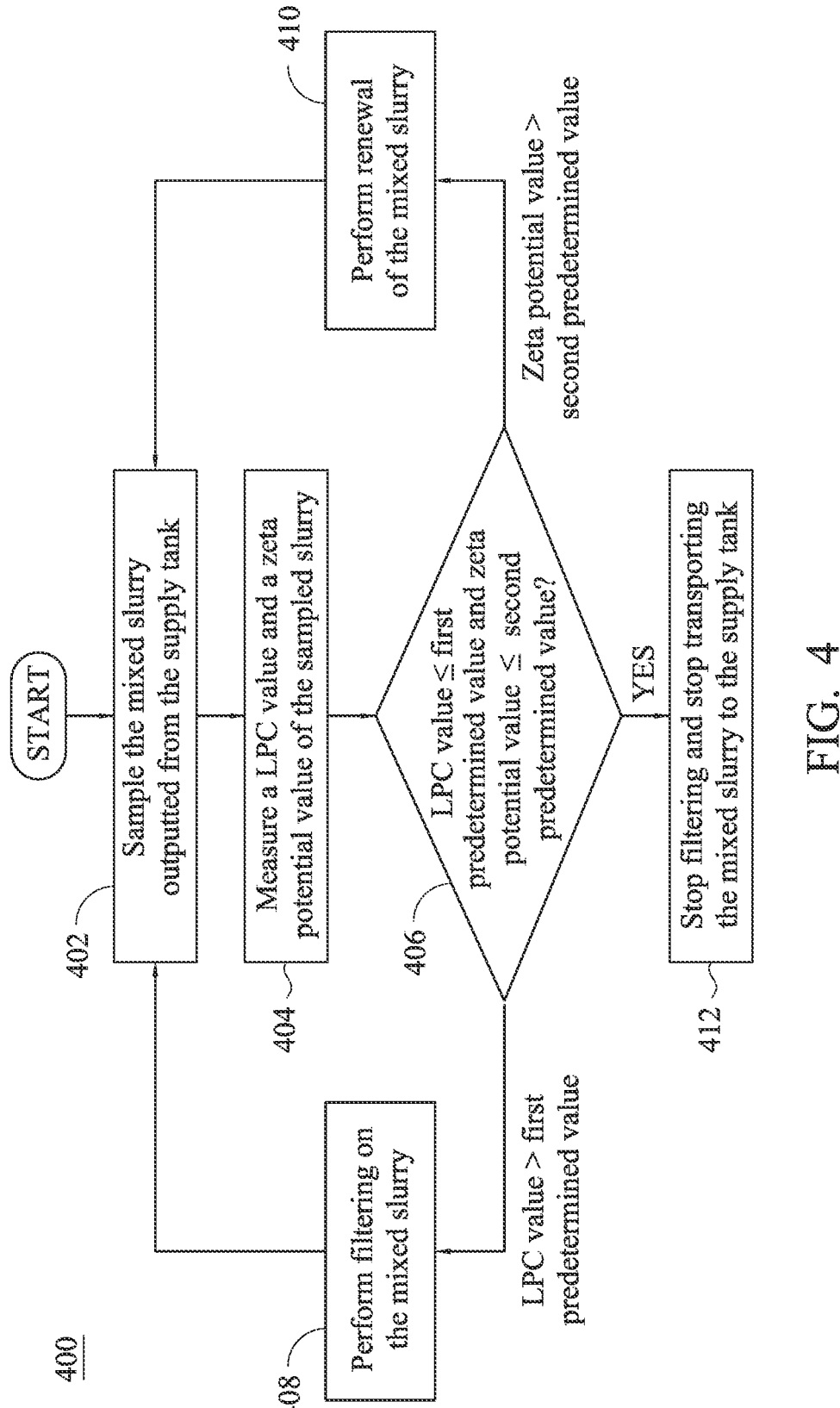
FIG. 4 is flow chart of a method for controlling slurry quality of a slurry dispersion system in accordance with some embodiments.

FIG. 4 is flowchart diagram of a method 400 for controlling slurry quality of a slurry dispersion system in accordance with various embodiments. The method 400 may be operated in the slurry dispersion system 300 or other systems similar to the slurry dispersion system 300. The following describes the method 400 operated in the control system 340 of the of the slurry dispersion system 300 for illustration. The method 400 begins at operation 402, where the sampling valve 341 samples the mixed slurry outputted from the supply tank 331, and allows the sampled slurry to be forwarded to the in-line analyzer 342. At operation 404, the in-line analyzer 342 measures a LPC value and a zeta potential value of the sampled slurry.

At operation 406, the in-line analyzer 342 compares the LPC value of the sampled slurry and the zeta potential value with a first predetermined threshold and a second predetermined threshold respectively. If the comparing result indicates that the LPC value of the sampled slurry is higher than the first predetermined threshold, operation 408 is then performed, where the in-line analyzer 342 generates an indication signal indicating that a LPC value of the mixed slurry is higher than a LPC target, and the controller 343 generates a control signal for controlling the filter 332 to perform filtering on the mixed slurry. In some embodiments, the control signal adjusts a filtering rate of the filter 332 based on a difference between an abrasive concentration value of the sampled slurry and a predetermined specification range. In some embodiments, the in-line analyzer 342 further determines whether a lifetime of the filter 332 expires. If the determination result indicates that the lifetime of the filter 332 expires, the in-line analyzer 342 generates an indication signal indicating the expiration of the filter 332, and the controller 343 issues a notification accordingly, so as to inform that the filter 332 to be substituted with a new filter. After operation 408, operation 404 is then performed.

At operation 406, if the comparing result indicates that the zeta potential value of the sampled slurry is higher than the second predetermined threshold, operation 410 is then performed, where the in-line analyzer 342 generates an indication signal indicating that a zeta potential value of the mixed slurry is higher than a zeta potential target, and the controller 343 generates a control signal for controlling the reactor 320 and the supply tank 331 to perform renewal of the mixed slurry stored in the supply tank 331. In detail, for the renewal of the mixed slurry, the control signal directs the supply tank 331 to dump a quantity of the mixed slurry and directs the reactor 320 to provide the mixed tank slurry for the supply tank 331 with the same quantity. In some embodiments, the quantity of the mixed slurry to be removed from the supply tank 331 is $(z-y) \times V_{total}/(x-y)$, where x is an initial zeta potential value of the mixed slurry outputted from the reactor 320, y is the zeta potential value of the sampled slurry sampled from an output of the supply tank 331, $z$ is a target zeta potential value, $V_{total}$ is the volume of the mixed slurry stored in the supply tank 331, and z is higher than x. In some embodiments, the quantity of the mixed slurry to be removed from the supply tank 331 is ( $z'-y') \times V'_{total}/(x'-y')$, where x' is a source LPC value of the slurry from the source tank 313, y' is the LPC value of the sampled slurry sampled from an output of the supply tank 331, $z'$ is a target LPC value, $V'_{total}$ is the volume of the mixed slurry stored in the supply tank 331, and $z'$ is higher than x'. After operation 410, operation 404 is then performed.

Otherwise, if the comparing result indicates that the LPC value of the sampled slurry is lower than or equal to the first predetermined threshold, and the zeta potential value of the sampled slurry is lower than or equal to the second predetermined threshold, the operation 412 is then performed, where the in-line analyzer 342 generates an indication signal indicating that the LPC value of the mixed slurry reaches the LPC target and that the zeta potential value of the mixed slurry reaches the zeta potential target, and the controller 343 generates control signals for controlling the filter 332 to stop filtering on the slurry and controlling the reactor 320 to stop transporting the mixed slurry to the supply tank 331 in response to the indication signal.

By performing the method 400, the operation of the circulation loop of the slurry supply system 330 is controlled, and the filtering rate of the filter 332 is dynamically adjusted, such that the quantity of large particles in the slurry is automatically controlled. Also, instant renewal of the mixed slurry is performed to compensate for the quality of the mixed slurry that may be deteriorated due to aging effect. Therefore, automatic and dynamic control of the slurry dispersion system 300 is realized.

Figure 5:
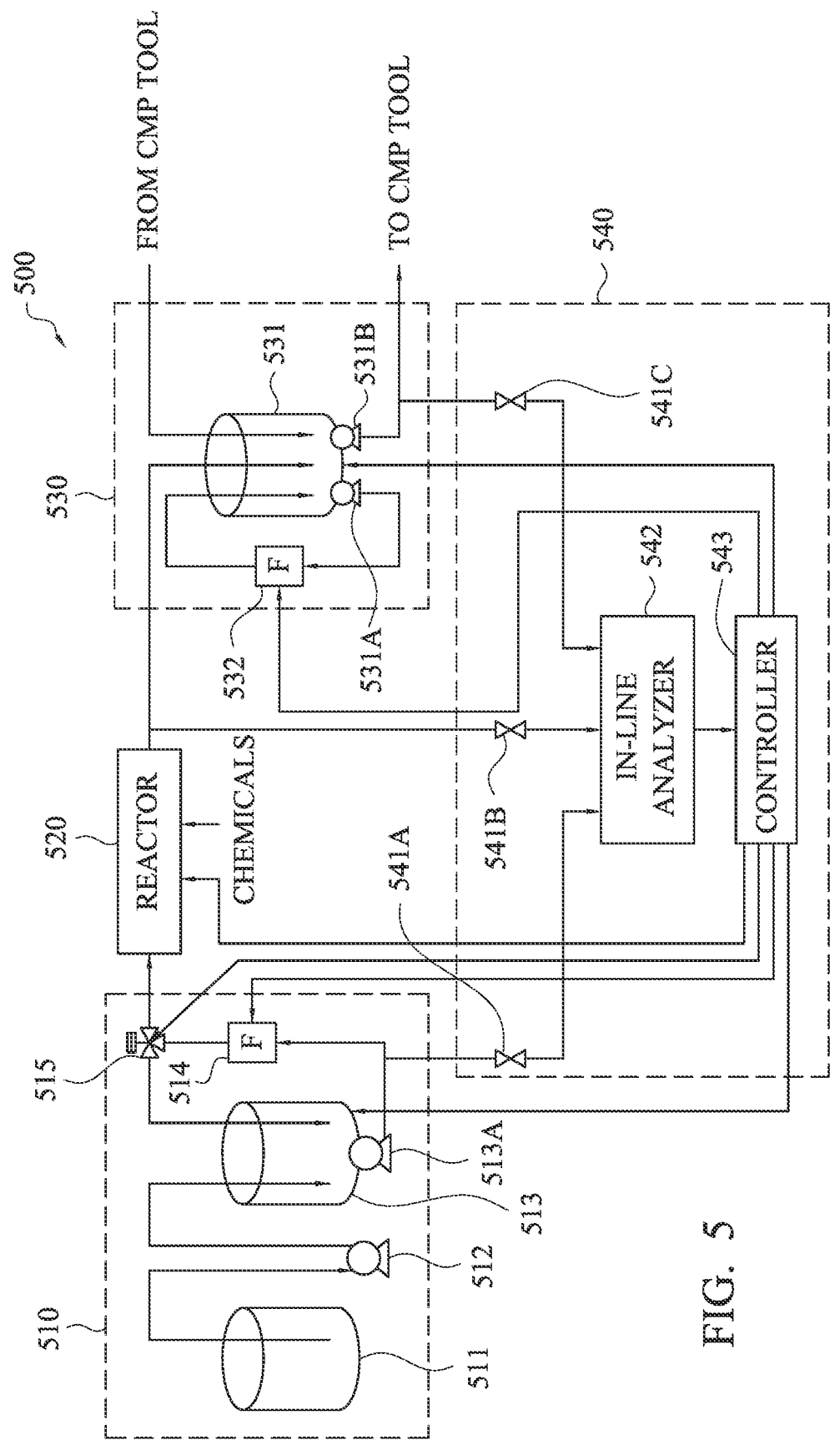
FIG. 5 is a schematic diagram of a slurry dispersion system in accordance with various embodiments.

FIG. 5 is schematic diagram of a slurry dispersion system 500 in accordance with some embodiments. The slurry dispersion system 500 is utilized for providing a slurry to a polishing process such as CMP process or the like. In the present disclosure, the slurry dispersion system 500 is used for a CMP tool which performs a CMP process for illustration. As shown in FIG. 5, the slurry dispersion system 500 includes a slurry source system 510, a reactor 520, a slurry supply system 530 and a control system 540. The slurry source system 510 includes a slurry drum 511, a slurry pump 512, a source tank 513, a filter 514 and a three-way valve 515. The slurry supply system 530 includes a supply tank 531 and a filter 532. The supply tank 531 collects a mixed slurry from the reactor 520, the filter 532 and the CMP process, and transports the mixed slurry to the filter 532 via a pump 531A. The supply tank 531 also includes a pump 531B for transporting the mixed slurry to the CMP process. Since the slurry source system 510, the reactor 520 and the slurry supply system 530 are essentially the same as the slurry source system 110, the reactor 120 and the slurry supply system 130 respectively, the details thereof are not described again herein.

The control system 540 includes sampling valves 541A, 541B and 541C, an in-line analyzer 542 and a controller 543. The sampling valve 541A samples the slurry outputted from the source tank 513 to obtain a first sampled slurry. The sampling valve 541B samples the mixed slurry outputted from the reactor 520 to obtain a second sampled slurry. The sampling valve 541C samples the mixed slurry outputted from the supply tank 531 to obtain a third sampled slurry. The in-line analyzer 542 measures at least one parameter of the first, second and third sampled slurry. The parameter may include a LPC value, which is relative to the number of large particles of the slurry, and/or include a zeta potential value, which is relative to the average electrical potential at a hydrodynamic slipping plane adjacent to a solid surface of each large particle exposed to a dispersing medium of the slurry. The in-line analyzer 542 generates an indication signal based on the parameter, in which the indication signal indicates at lease one characteristic of the slurry and/or the mixed slurry. In some embodiments, the parameter may further include a pH value, a specific gravity value and/or a chemical concentration value (e.g. hydrogen peroxide concentration value), but is not limited thereto. The controller 543 receives the indication signal, and generates a control signal based on the indication signal to perform a real time feedback control on the slurry dispersion system 500. In some embodiments, the controller 543 is a programmable logic controller (PLC) for real time feedback control on the slurry dispersion system 500 over one or more conditions corresponding to the indication signal.

In the slurry dispersion system 500, the sampling valves 541A, 541B and 541C are configured to sample the slurry outputted from the source tank 513 and the mixed slurry outputted from the reactor 520 and the supply tank 531, so as to obtain the first sampled slurry, the second sampled slurry and the third sampled slurry separately. The indication signal may be generated in relation to the first sampled slurry, the second sampled slurry, the three sampled slurry and/or combinations thereof. In addition, the controller 543 may further adjust, for example, a flow rate of the slurry flowing into the reactor 520, titration of the chemical titrated into the reactor 520, and/or other adjustable factors in the slurry dispersion system 500.

Figure 6:
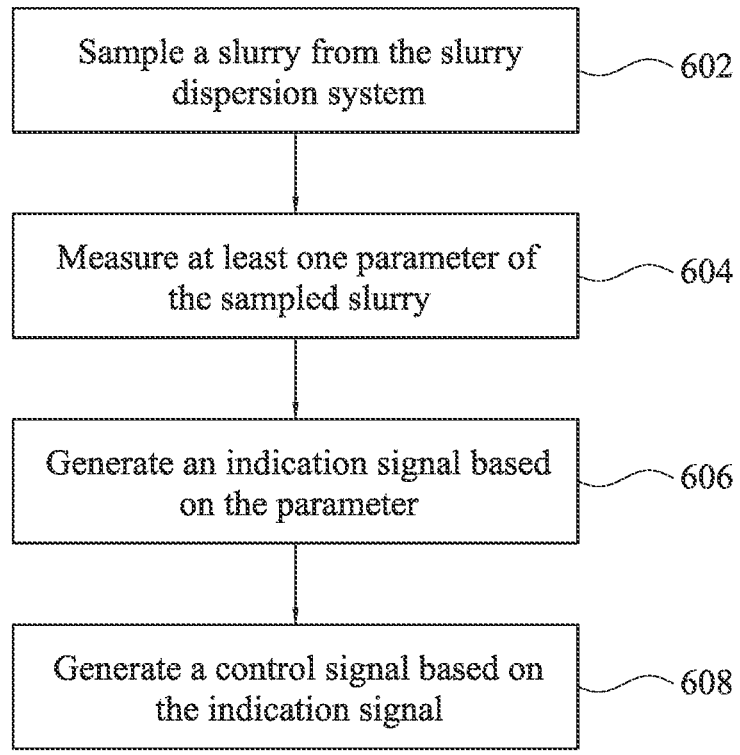
FIG. 6 is a flow chart of a method for real time feed-back controlling a slurry dispersion system in accordance with various embodiments.

FIG. 6 is a flowchart diagram of a method 600 for real time feed-back controlling a slurry dispersion system in accordance with various embodiments. The method 600 is operated in a slurry dispersion system such as that shown in FIG. 1, FIG. 3 or FIG. 5, and/or other suitable slurry dispersion systems.

The method 600 begins at operation 602, where a slurry is sampled from the slurry dispersion system to obtain a sampled slurry. The sampled slurry may be undiluted or be mixed with at least one chemical. The chemical may include, but is not limited to, hydrogen peroxide, potassium and/or ammonium hydroxide.

At operation 604, at least one parameter of the sampled slurry is measured. The parameter may include a LPC value, which is relative to the number of large particles of the slurry, and/or include a zeta potential value, which is relative to the average electrical potential at a hydrodynamic slipping plane adjacent to a solid surface of each large particle exposed to a dispersing medium of the slurry. In some embodiments, the parameter may further include a pH value, a specific gravity value and/or a chemical concentration value (e.g. hydrogen peroxide concentration value), but is not limited thereto.

At operation 606, an indication signal is generated based on the parameter. The indication signal indicates at lease one characteristic of the slurry, such as a LPC value and/or a zeta potential value of the slurry. The indication signal is generated by comparing the LPC value with a first predetermined threshold, or by comparing the zeta potential value with a second predetermined threshold. In some embodiments, the characteristic may further include a pH value, a specific gravity value and/or a chemical concentration value (e.g. hydrogen peroxide concentration value) of the slurry, but is not limited thereto.

At operation 608, a control signal is generated based on the indication signal. The control signal is used to perform a real time feedback control on the slurry dispersion system for controlling quality of the slurry in the slurry dispersion system. In some embodiments, the control signal instructs a supply tank of the slurry dispersion system to dump a quantity of the mixed slurry and directs a reactor of the slurry dispersion system to provide the mixed slurry for the supply tank with the same quantity. In some embodiments, the quantity of the mixed slurry to be removed from the supply tank is $(z-y) \times V_{total}/(x-y)$, where x is an initial zeta potential value of the mixed slurry outputted from the reactor, y is the zeta potential value of the sampled slurry sampled from an output of the supply tank, z is a target zeta potential value, $V_{total}$ is the volume of the mixed slurry stored in the supply tank, and z is higher than x. In alternative embodiments, the quantity of the mixed slurry to be removed from the supply tank is $(z'-y') \times V'_{total}/(x'-y')$, where x' is a source LPC value of the slurry of a slurry source system of the slurry dispersion system, y' is the LPC value of the sampled slurry sampled from an output of the supply tank, z' is a target LPC value, $V'_{total}$ is the volume of the mixed slurry stored in the supply tank, and z' is higher than x'.

In accordance with some embodiments, the present disclosure discloses a slurry dispersion system comprising a slurry source system, a reactor, a slurry supply system, an in-line analyzer and a controller. The slurry source system is configured to provide an undiluted slurry. The reactor is connected to the slurry source system, wherein the reactor is configured to mix the undiluted slurry with at least one chemical to obtain and transport a mixed slurry. The slurry supply system is connected to the reactor, wherein the slurry supply system is configured to store the mixed slurry transported from the reactor and to output the mixed slurry to a chemical mechanical polishing (CMP) tool. The in-line analyzer is connected to the slurry supply system. The in-line analyzer is configured to measure parameters that include a large particle count (LPC) value of a sampled slurry sampled from the slurry supply system, and generate a first indication signal in response to the LPC value being greater than a first predetermined threshold. The controller is electrically connected to the in-line analyzer and a filter of the slurry supply system. The controller is configured to turn on the filter to start filtering the mixed slurry in response to the first indication signal.

In accordance with some embodiments, the present disclosure discloses a slurry dispersion system comprising a slurry source system, a reactor, a slurry supply system, an in-line analyzer and a controller. The slurry source system is configured to provide an undiluted slurry. The reactor is connected to the slurry source system, wherein the reactor is configured to mix the undiluted slurry with at least one chemical to obtain and transport a mixed slurry. The slurry supply system is connected to the reactor, wherein the slurry supply system is configured to store the mixed slurry transported from the reactor and to output the mixed slurry to a chemical mechanical polishing (CMP) tool. The in-line analyzer is connected to the slurry supply system. The in-line analyzer is configured to: measure parameters that include a large particle count (LPC) value and a zeta potential value of a sampled slurry sampled from the slurry supply system, and generate a first indication signal in response to the LPC value being smaller than a first predetermined threshold and the zeta potential value being smaller than a second predetermined threshold. The controller is electrically connected to the in-line analyzer and a filter of the slurry supply system. The controller is configured to turn off the filter to stop filtering the mixed slurry in response to the first indication signal.

In accordance with some embodiments, the present disclosure discloses a method for feed-back control of a slurry dispersion system. The method includes sampling the mixed slurry to obtain a sampled slurry, determining whether a zeta potential value of the sampled slurry is greater than a first predetermined threshold, and performing a renewal of the mixed slurry in response to determining that the zeta potential value is greater than the first predetermined threshold.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A slurry dispersion system, comprising:
a slurry source system configured to provide an undiluted slurry;
a reactor connected to the slurry source system, wherein the reactor is configured to mix the undiluted slurry with at least one chemical to obtain and transport a mixed slurry;

a slurry supply system connected to the reactor, wherein the slurry supply system is configured to store the mixed slurry transported from the reactor and to output the mixed slurry to a chemical mechanical polishing (CMP) tool, wherein the slurry supply system comprises a supply tank, a first filter, and a first pump downstream of the supply tank and upstream of the first filter, wherein the first filter is upstream of the supply tank, wherein the slurry supply system further comprises a second pump downstream of the supply tank and upstream of the CMP tool, wherein the second pump is independent of the first pump;
an in-line analyzer connected to the slurry supply system, wherein the in-line analyzer is configured to:
measure parameters that include a large particle count (LPC) value of a sampled slurry sampled from the mixed slurry stored in the slurry supply system; and
in response to the LPC value being greater than a first predetermined threshold, generate a first indication signal; and
a controller electrically connected to the in-line analyzer and the first filter of the slurry supply system, wherein the controller is configured to turn on the first filter to start filtering the mixed slurry in response to the first indication signal.

2. The slurry dispersion system of claim 1, further comprising:
a sampling valve downstream of the second pump and upstream of the in-line analyzer and configured to sample the mixed slurry to obtain the sampled slurry.

3. The slurry dispersion system of claim 1, wherein the in-line analyzer is further configured to generate a second indication signal in response to the LPC value being lower than or equal to the first predetermined threshold, and the controller is further configured to turn off the first filter to stop filtering the mixed slurry in response to the second indication signal.

4. The slurry dispersion system of claim 1, wherein the in-line analyzer further measures a zeta potential value of the sampled slurry sampled from the slurry supply system.

5. The slurry dispersion system of claim 4, wherein the in-line analyzer further generates a second indication signal in response to the zeta potential value being greater than a second predetermined threshold, and the controller triggers different operations in response to the first indication signal and the second indication signal.

6. The slurry dispersion system of claim 5, wherein the controller triggers renewal of the mixed slurry in response to the second indication signal.

7. The slurry dispersion system of claim 1, wherein the slurry source system comprises:
a source tank;
a second filter downstream of the source tank; and
a three-way valve having a first port downstream of the second filter, a second port upstream of the source tank, and a third port upstream of the reactor.

8. The slurry dispersion system of claim 7, wherein the slurry source system further comprises:
a slurry drum upstream of the source tank; and
a pump controlling a transport rate of the undiluted slurry to the source tank.

9. A method for feedback controlling a slurry dispersion system, the slurry dispersion system having a slurry source system, a reactor and a slurry supply system, the slurry source system configured to store an undiluted slurry and transport the undiluted slurry to the reactor, the reactor configured to mix the undiluted slurry with at least one chemical to obtain a mixed slurry and transport the mixed slurry to the slurry supply system, the slurry supply system configured to store the mixed slurry and output the mixed slurry for a chemical mechanical polishing (CMP) process, and the slurry supply system including a filter configured to filter the mixed slurry, the method comprising:

sampling the mixed slurry to obtain a sampled slurry;

determining whether a large particle count (LPC) value of the sampled slurry is greater than a first predetermined threshold;

in response to determining that the LPC value is greater than the first predetermined threshold, performing a filtering operation on the mixed slurry, wherein the filtering operation comprises circulating the mixed slurry between a supply tank of the slurry supply system and the filter by using a first pump downstream of the supply tank and upstream of the filter, wherein the filter is upstream of the supply tank; and transporting the mixed slurry to a CMP tool by using a second pump downstream of the supply tank and upstream of the CMP tool, wherein the second pump is independent of the first pump.

10. The method of claim 9, further comprising:

determining whether a zeta potential value of the sampled slurry is greater than a second predetermined threshold; and in response to determining that the zeta potential value is greater than the second predetermined threshold, performing an operation different from the filtering operation.

11. The method of claim 10, wherein the operation performed in response to determining that the zeta potential value is greater than the second predetermined threshold comprises:

dumping the mixed slurry and controlling the reactor to provide another mixed slurry to the slurry supply system.

12. The method of claim 9, further comprising:

in response to determining that the LPC value is lower than the first predetermined threshold, stopping the filtering operation.

13. The method of claim 9, further comprising:

in response to determining that the LPC value is lower than the first predetermined threshold, stopping transporting the mixed slurry from the reactor to the slurry supply system.

14. The method of claim 9, further comprising:

determining whether a lifetime of the filter expires; and in response to determining that the lifetime of the filter expires, substituting the filter with a new filter.

15. The method of claim 9, further comprising:

comparing an abrasive concentration value of the sampled slurry with a predetermined specification range; and adjusting a filtering rate of the filter based on a difference of the comparison result between abrasive concentration value and the predetermined specification range.

16. The method of claim 9, further comprising:

after performing the filtering operation, sampling the mixed slurry to obtain another sampled slurry again.

17. The method of claim 9, wherein sampling the mixed slurry is performed by using a sampling valve downstream of the second pump.

18. A method for feedback controlling a slurry dispersion system, the slurry dispersion system having a slurry source system, a reactor and a slurry supply system, the slurry source system configured to store an undiluted slurry and transport the undiluted slurry to the reactor, the reactor configured to mix the undiluted slurry with at least one chemical to obtain a mixed slurry and transport the mixed slurry to the slurry supply system, the slurry supply system configured to store the mixed slurry and output the mixed slurry for a chemical mechanical polishing (CMP) process, and the slurry supply system including a filter configured to filter the mixed slurry, the method comprising:

sampling the mixed slurry to obtain a sampled slurry;

determining whether a large particle count (LPC) value of the sampled slurry is greater than a first predetermined threshold;

in response to determining that the LPC value is greater than the first predetermined threshold, turning on the filter;

circulating the mixed slurry between a supply tank of the slurry supply system and the filter by using a first pump downstream of the supply tank and upstream of the filter, wherein the filter is upstream of the supply tank; and transporting the mixed slurry to a CMP tool by using a second pump downstream of the supply tank and upstream of the CMP tool, wherein the second pump is independent of the first pump.

19. The method of claim 18, further comprising:

determining whether a zeta potential value of the sampled slurry is greater than a second predetermined threshold; and in response to determining that the zeta potential value is greater than the second predetermined threshold, removing a portion of the mixed slurry and adding renewal mixed slurry.

20. The method of claim 18, further comprising:

in response to determining that the LPC value is lower than the first predetermined threshold, stopping transporting the mixed slurry to the slurry supply system.

* * * * *